United States Patent [19]
Mok

[11] Patent Number: 5,952,754
[45] Date of Patent: Sep. 14, 1999

[54] ELECTRIC MOTOR

[75] Inventor: Kam-Shing Mok, Fairview Park, The Hong Kong Special Administrative Region of the People's Republic of China

[73] Assignee: Johnson Electric S.A., La Chaux-de-Fonds, Switzerland

[21] Appl. No.: 09/018,895

[22] Filed: Feb. 5, 1998

[30] Foreign Application Priority Data

Feb. 7, 1997 [GB] United Kingdom .................... 9702472

[51] Int. Cl.$^6$ ...................................................... H02K 5/00
[52] U.S. Cl. ................................. 310/91; 310/89; 310/88; 310/85; 310/43
[58] Field of Search ................................ 310/88, 85, 89, 310/91, 43

[56] References Cited

U.S. PATENT DOCUMENTS 5,184,041  2/1993  Baer et al. ............................. 310/239
5,191,698  3/1993  Sumi et al. ............................. 29/596

*Primary Examiner*—Nestor Ramirez
*Assistant Examiner*—Thanh Lam
*Attorney, Agent, or Firm*—Birch, Stewart, Kolasch & Birch, LLP

[57] ABSTRACT

A moulded plastics material end bracket for a universal motor comprises a U-shaped frame having a base extending between two legs. Brush cages are formed integrally with the two legs and a dust shield in the form of an annular ring formed integrally with the two legs extends axially from the stator core between the stator windings and the commutator and defining a space in which the commutator is located thereby shielding the stator windings from carbon dust generated by the wearing of the brushes on the commutator.

6 Claims, 2 Drawing Sheets

ELECTRIC MOTOR

FIELD OF THE INVENTION

This invention relates to electric motors and in particular, to universal motors.

BACKGROUND OF THE INVENTION

Universal motors have wound rotors and wound stators with brushes rubbing on a commutator to transfer electrical power to the rotor windings. Dust is generated as the brushes wear through rubbing on the commutator and this dust is conductive, being substantially carbon. This dust poses a tracking risk to the motor's electrical circuit should it be allowed to build up on the winding ends and/or around the brush cages. In prior arrangements, the coils have been wound on bobbins which are fitted to the stator cores or the cores have been fitted with slot liners or supports which include sections to shield the coils from the build up of brush dust. Prior designs usually involve the use of a metal end bracket or bearing bracket which also supports the cages for the brushes. In this arrangement, shields may be provided to prevent the build up of brush dust about and along the brush cage to avoid shorting the brush to the metal end bracket. More recently, the end bracket has been made from a non-conductive material such as injection moulded plastics material where application stresses allow, and greatly reduce the risk of tracking or shorting of a brush to earth or a metal component of the motor. The problem of tracking or dust accumulation between the coils and the stator core has been overcome by providing separate parts to act as a barrier to the build up of a conductive path of carbon dust between the coils and the stator core by extending the length of such a path known as the creepage distance. The use of additional parts increases material cost and assembly cost by increasing the time and steps required in manufacture of the motor by fitting the separate parts.

SUMMARY OF THE INVENTION

The present invention seeks to enable the cost of producing a motor to be reduced by reducing the assembly cost while protecting the coils from dust tracking by reducing the number of separate parts by incorporating the coil end dust shields into the moulding of the end bracket.

Accordingly, the present invention provides an end bracket for a universal motor having a wound stator, a wound rotor including a commutator and brushes for transferring electrical power to the commutator. The end bracket comprises a moulded U-shaped frame of insulating material, the frame having two legs, each having first and second ends and a base extending between the first ends of the legs, the base being adapted to receive a bearing, the legs each having integral therewith a respective through passage for slidably receiving the brushes, the second ends of the legs being adapted to engage a stator core of the motor and a dust shield integral with the two legs and arranged to fit close to the stator core defining an inner space for accommodating the commutator of the motor, the dust shield being arranged, in use, to shield the stator core from dust generated by wearing of the brushes.

Preferably, the shield forms at least a part of an annular ring extending axially from the region of the stator core of the motor and surrounding the commutator.

Preferably, there are openings between the shield and the base of the frame to allow passage of cooling air.

By forming the shield as part of the end bracket, especially as an integral part thereof, the shield does not take any additional time to assemble. As an integral part, there is the possibility for material savings as well as assembly cost savings. By being an annular ring, the shield can closely enclose the commutator which is also round and by extending axially from the stator core, effectively shielding the coil which is located outside the shield. Thus, the shield forms a barrier between the coils and the brushes from which the dust is generated. The openings between the shield and the base of the frame allow cooling air to pass over the core and commutator cooling the motor and entraining the carbon dust away from the brushes and coil ends.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
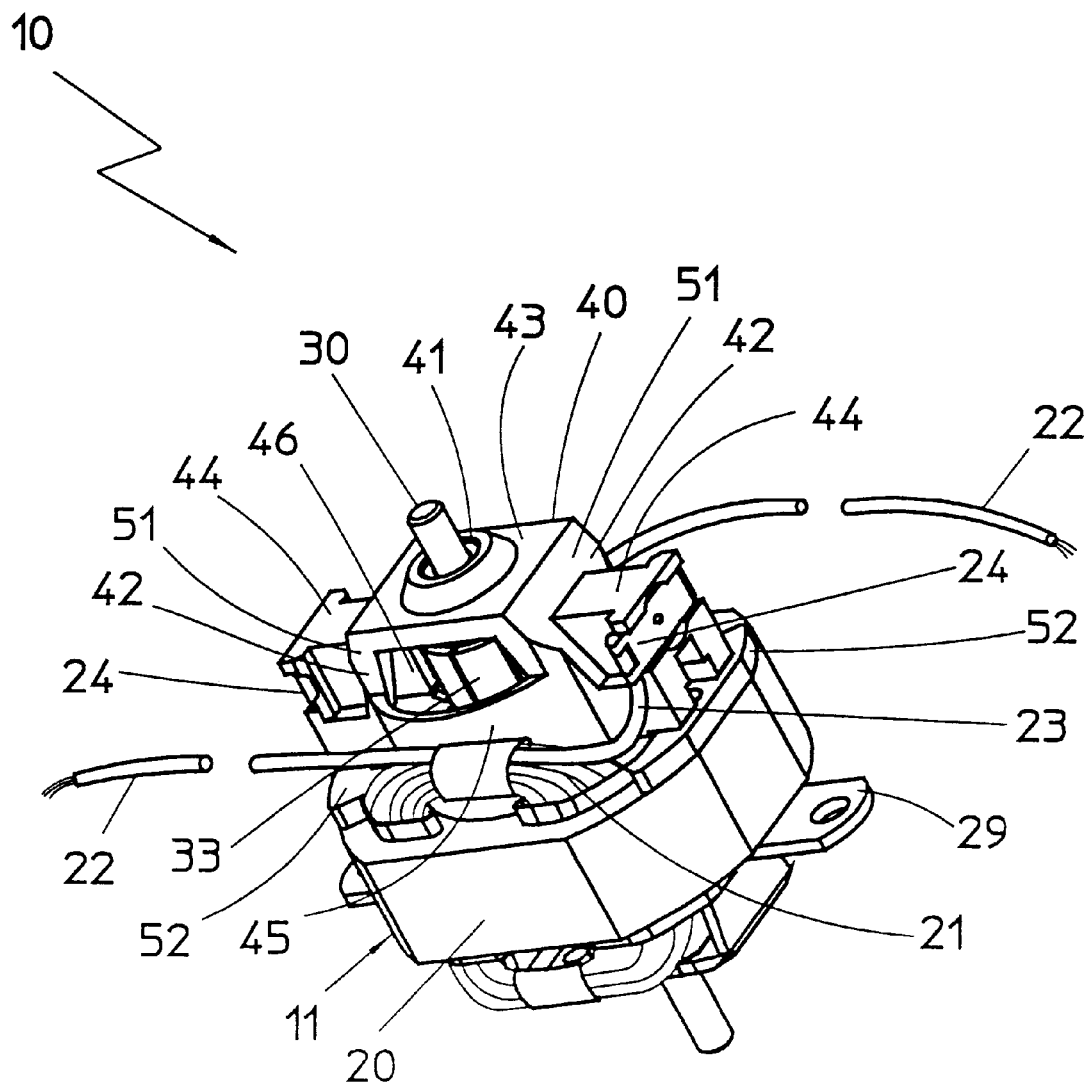
FIG. 1 is a perspective view of a universal motor embodying the present invention.

The figures illustrate an electric motor 10 of the universal type. The motor comprises a wound stator 11 and a wound rotor 12. The stator 11 comprises a stator core 20 comprising a plurality of stacked laminations forming two stator poles. About each stator pole is located the stator winding or coil 21. Each coil has two coil ends which extend axially from the stator core. The coils are formed by winding copper wire with an insulating coating of varnish. The coil is electrically isolated from the stator core by its varnish coating and by slot insulation which comprises sheets of flexible insulating material disposed between the stator core and the coil in the slots in which the coil is located. Connecting leads 22 connect the stator coils to an external power source. Leads 23 connected the coils to the brushes 26 via brush gear terminals 24 and brush springs 25.

The rotor 12 has a shaft 30, a rotor core 31 mounted to the shaft 30, rotor windings (not shown) wound around poles of the rotor core and a commutator 33 mounted on the shaft 30 adjacent one end of the rotor core 31. The ends of the rotor coils are terminated on tangs of the commutator. The shaft 30 is journalled in bearings 28, 41 to allow free rotation of the rotor with the rotor core held in confronting relationship with the poles of the stator core 20.

Figure 2:
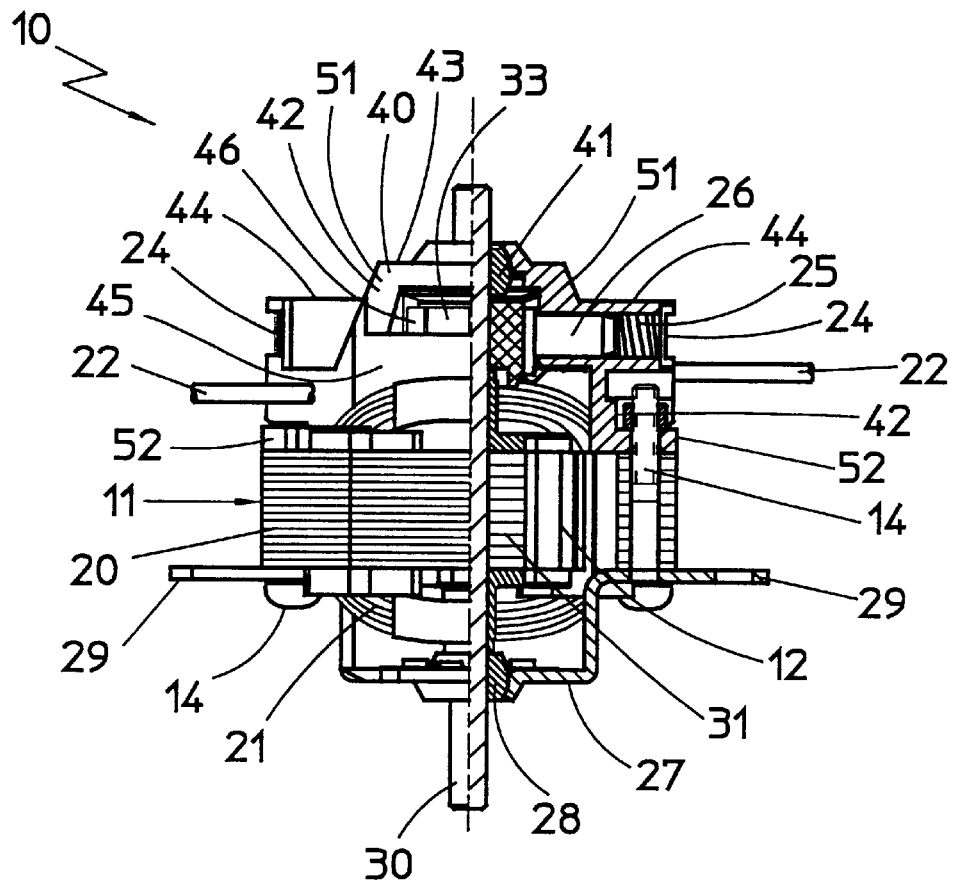
FIG. 2 is an elevational view in partial section of the motor of FIG. 1.
Figure 3:
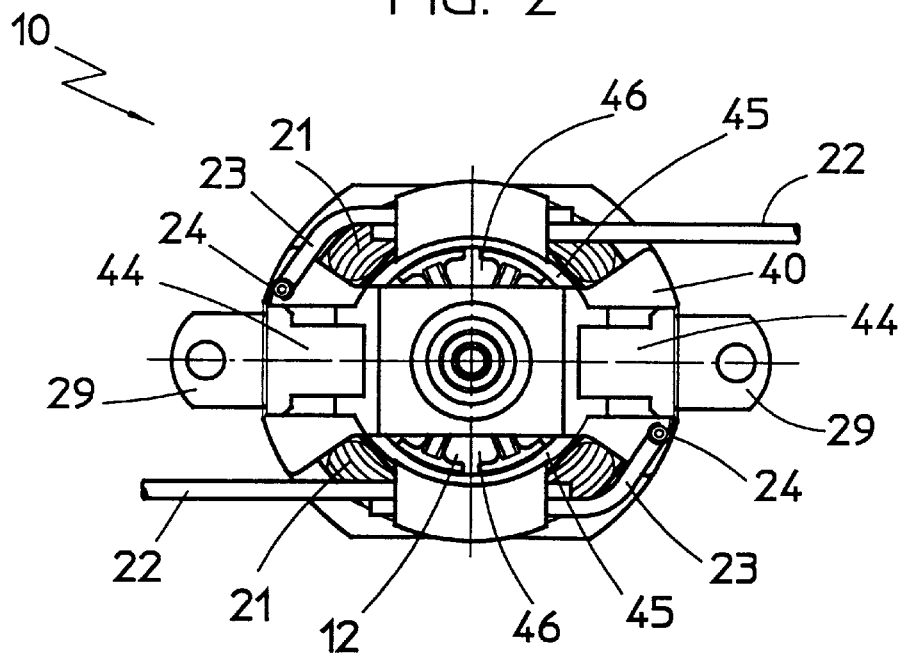
FIG. 3 is a plan view of the motor of FIG. 1.

End brackets 27, 40 are fitted at each end of the stator core 20. End bracket 27 at the drive end of the motor supports a bearing 28 for the motor shaft 30. End bracket 27 is formed with two ears or tabs 29 for mounting the motor to an appliance. End bracket 27 has a U-shaped profile as can be seen in FIG. 2 and is a pressed steel part.

The other end bracket 40 at the non-drive end (NDE) of the motor also supports a bearing 41 for the motor shaft 30.

NDE bracket 40 is a moulded plastics material part and comprises a U-shaped frame with two legs 42 connected by a base 43 at one end 51. Bearing 41 is received in a recess in the base 43. Bearing 41 is shown in FIG. 2 as a self-aligning sleeve bushing. Integral with the legs 42 are brush cages 44 in the form of slots or through passages in which the brushes 26 slide towards the commutator 33 under the influence of brush springs 25.

The free ends 52 of the legs 42 are arranged to abut or mate with the stator core 20 and bolts 14 clamp both end brackets to the stator core 20.

Also integral with the legs 42 is a shield 45 which, with the legs 42, forms a ring surrounding the commutator and extending axially outwardly from a position adjacent an end face of the stator core 20. Two apertures 46 are formed between the base 43 and the shield 45 allowing cooling air to circulate around the commutator. If a fan is used to cool the motor, the air flow generated by the fan may help to remove the dust from the motor or at least from the area of the shield.

The inner surface of the shield may be made smooth to avoid or reduce the tendency for the shield to collect dust. Alternatively, the inner surface of the shield may be roughened to encourage the build up of the carbon dust on the shield surface. Ideally, the inner surface of the shield may be a combination of smooth and roughened areas to restrict build-up in some areas, i.e., around the edges of the shield, especially near the stator core and to encourage the build up or retention of dust in other areas such as towards the middle of the shield. In this manner, the location of the build up of the dust can be controlled without simply passing the dust to other parts of the motor.

Although we have described one embodiment, variations will be readily apparent to the reader and it is intended to cover all such variations as fall within the spirit of the invention as defined by the following claims.

I claim:

1. An end bracket for an universal motor having a stator including a stator core and stator windings, a wound rotor including a shaft and a commutator, and brushes for feeding electrical power to the commutator, the end bracket being a molded U-shaped frame of insulating material and comprising:
   two legs;
   a base;
   two brush cages; and
   a dust shield;
   wherein each leg has a first end and a second end, the first end being adapted to engage the stator core,
   wherein the base extends between the second ends of the legs and is adapted to receive a bearing for rotatably supporting the shaft,
   wherein each brush cage is integrally formed with a respective leg for guiding the brushes to the commutator, and
   wherein the dust shield defines an inner space for accommodating the commutator and is adapted to be arranged in use to fit close to the stator core to shield the stator windings from dust generated by wearing of the brushes on the commutator.

2. The end bracket as defined in claim 1 wherein the shield forms at least a part of an annular ring extending axially from the stator core of the motor and surrounding the commutator.

3. The end bracket as defined in claim 2 wherein openings are provided between the shield and the base of the frame to allow passage of cooling air.

4. The end bracket as defined in claim 2 wherein a radially inner surface of the shield has portions which are adapted to resist the retention of dust particles.

5. The end bracket as defined in claim 2 wherein a radially inner surface of the dust shield has portions adapted to retain dust particles.

6. A universal motor incorporating an end bracket as defined in claim 1.

* * * * *